(12) United States Patent  
Cronin

(10) Patent No.: US 9,078,098 B1  
(45) Date of Patent: Jul. 7, 2015

(54) GEO-FENCING BASED FUNCTIONS

(71) Applicant: GrandiOs Technologies, LLC, Wilmington, DE (US)

(72) Inventor: John Cronin, Bonita Springs, FL (US)

(73) Assignee: GRANDIOS TECHNOLOGIES, LLC, Wilmington, DE (US)

( * ) Notice: Subject to any disclaimer, the term of this patent is extended or adjusted under 35 U.S.C. 154(b) by 0 days.

(21) Appl. No.: 14/622,801

(22) Filed: Feb. 13, 2015

Related U.S. Application Data

(60) Provisional application No. 62/007,820, filed on Jun. 4, 2014.

(51) Int. Cl.
| | |
|---|---|
| *H04W 24/00* | (2009.01) |
| *H04W 4/02* | (2009.01) |
| *H04W 64/00* | (2009.01) |

(52) U.S. Cl.
CPC .............. *H04W 4/021* (2013.01); *H04W 64/00* (2013.01)

(58) Field of Classification Search
CPC ....... H04W 4/021; H04W 64/00; H04W 4/02; H04W 4/027; H04W 4/04; H04W 8/10; H04W 4/028; H04W 4/008; H04W 4/023; H04W 4/026; H04W 8/04; H04W 4/00; H04W 4/043; H04W 52/0229; H04W 52/0245
USPC .......................................................... 455/456
See application file for complete search history.

(56) References Cited

U.S. PATENT DOCUMENTS

| | | | |
|---|---|---|---|
| 8,548,735 B2 | 10/2013 | Forstall et al. | |
| 8,583,188 B2 | 11/2013 | Sundaresan et al. | |
| 8,589,667 B2 | 11/2013 | Mujtaba et al. | |
| 8,611,930 B2 | 12/2013 | Louboutin et al. | |
| 8,620,344 B2 | 12/2013 | Huang et al. | |
| 8,626,465 B2 | 1/2014 | Moore et al. | |
| 8,630,216 B2 | 1/2014 | Deivasigamani et al. | |
| 8,660,501 B2 | 2/2014 | Sanguinetti | |
| 8,706,044 B2 | 4/2014 | Chang et al. | |
| 8,724,723 B2 | 5/2014 | Panicker et al. | |
| 8,750,207 B2 | 6/2014 | Jeong et al. | |
| 8,793,094 B2 | 7/2014 | Tam et al. | |
| 8,816,868 B2 | 8/2014 | Tan et al. | |
| 8,831,529 B2 | 9/2014 | Toh et al. | |

(Continued)

OTHER PUBLICATIONS

OSXDaily—How to Limit Ad Tracking in iOS—http://osxdaily.com/2012/10/15/limit-ad-tracking-ios/—Oct. 15, 2012.

(Continued)

*Primary Examiner* — Kwasi Karikari  
(74) *Attorney, Agent, or Firm* — Lewis Roca Rothgerber LLP

(57) ABSTRACT

Systems and methods are provided for geo-fencing using a mobile device. In certain instances, the geo-function setting sets boundaries relating to when alerts may be presented to a user of the electronic device, or when an alert may be transmitted to another electronic device. A geo-function setting may relate a perimeter around a location, or may relate to a perimeter bracketing a pre-defined route traversed by a person carrying the electronic device. When the electronic device crosses a perimeter, an alert may be presented or transmitted according to the operating system setting. In other instances, a geo-function may be initiated though a user interface of the electronic device, and may relate to the learning of a route traversed by a person carrying the electronic device.

20 Claims, 5 Drawing Sheets

(56) References Cited

U.S. PATENT DOCUMENTS

| | | |
|---|---|---|
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 2006/0205394 A1 | 9/2006 | Vesterinen |
| 2007/0116194 A1 | 5/2007 | Agapi et al. |
| 2007/0214344 A1 | 9/2007 | Helvick |
| 2009/0170479 A1 | 7/2009 | Jarenskog |
| 2010/0159956 A1 | 6/2010 | Lee |
| 2011/0105150 A1 | 5/2011 | Moon et al. |
| 2012/0047011 A1 | 2/2012 | Rippetoe et al. |
| 2012/0329555 A1 | 12/2012 | Jabara et al. |
| 2013/0172013 A1 | 7/2013 | Dessouky et al. |
| 2013/0231999 A1 | 9/2013 | Emrich et al. |
| 2013/0273892 A1 | 10/2013 | Parker |
| 2013/0297422 A1 | 11/2013 | Hunter et al. |
| 2013/0303192 A1 | 11/2013 | Louboutin |
| 2013/0317835 A1 | 11/2013 | Mathew |
| 2013/0326137 A1* | 12/2013 | Bilange et al. ............ 711/113 |
| 2013/0328917 A1 | 12/2013 | Zhou |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0332172 A1 | 12/2013 | Prakash et al. |
| 2014/0062773 A1 | 3/2014 | MacGougan |
| 2014/0065962 A1 | 3/2014 | Le |
| 2014/0071221 A1 | 3/2014 | Dave |
| 2014/0105084 A1 | 4/2014 | Chhabra |
| 2014/0139380 A1 | 5/2014 | Ouyang |
| 2014/0141803 A1 | 5/2014 | Marti |
| 2014/0162628 A1 | 6/2014 | Bevelacqua |
| 2014/0167794 A1 | 6/2014 | Nath |
| 2014/0168170 A1 | 6/2014 | Lazarescu |
| 2014/0171114 A1 | 6/2014 | Marti |
| 2014/0180820 A1 | 6/2014 | Louboutin |
| 2014/0188636 A1 | 7/2014 | Vandyke et al. |
| 2014/0191979 A1 | 7/2014 | Tsudik |
| 2014/0200053 A1 | 7/2014 | Balasubramanian |
| 2014/0222335 A1 | 8/2014 | Piemonte |
| 2014/0232633 A1 | 8/2014 | Shultz |
| 2014/0232634 A1 | 8/2014 | Piemonte |
| 2014/0247279 A1 | 9/2014 | Nicholas |
| 2014/0247280 A1 | 9/2014 | Nicholas |
| 2014/0269562 A1 | 9/2014 | Burchill |
| 2014/0274150 A1 | 9/2014 | Marti |
| 2014/0283135 A1 | 9/2014 | Shepherd |
| 2014/0293959 A1 | 10/2014 | Singh |
| 2014/0364089 A1 | 12/2014 | Lienhart |
| 2014/0364148 A1 | 12/2014 | Block |
| 2014/0365120 A1 | 12/2014 | Vulcano |
| 2015/0011242 A1 | 1/2015 | Nagaraj |
| 2015/0026623 A1 | 1/2015 | Horne |
| 2015/0031397 A1 | 1/2015 | Jouaux |

OTHER PUBLICATIONS

U.S. Appl. No. 14/626,848 Office Action mailed Apr. 1, 2015.
U.S. Appl. No. 14/628,087 Office Action mailed Apr. 14, 2015.
"Flash Player Settings Help", Adobe Flash Player, Date of download: Feb. 19, 2014.
GeoMoby—Location & Context Aware Services, Real-Time GeoFencing and Highly Targeted Messaging for Businesses, Date of download: Dec. 6, 2013.
"Launch Center Pro on the App Store on iTunes" by Contrast. Date of download: Feb. 19, 2014.
Save the Elephants—Elephant Geofencing, Date of download: Dec. 8, 2013 http://www.savetheelephants.org/research-reader/items/elephnts. . . .
Sayta, Ana; "How to create advanced actions in Launch Center Pro for iPhone and iPad", Periscope Post, Feb. 19, 2014.

* cited by examiner

GEO-FENCING BASED FUNCTIONS

CROSS-REFERENCE TO RELATED APPLICATIONS

The present application claims the priority benefit of U.S. provisional application No. 62/007,820 filed Jun. 4, 2014 and entitled "Geo-Fencing Based Functions," the disclosure of which is incorporated herein by reference.

BACKGROUND OF THE INVENTION

1. Field of the Invention

The present invention generally relates to the field of geo-location and geo-route-enabled software. More specifically, the present invention relates to establishing a virtual perimeter (geo-fence) around a geographic location or route, and enabling an alert to a user based on the user's location relative to the geographic location or route.

2. Description of the Related Art

Many modern smartphones are equipped with digital maps, global position systems, and navigation software. Typically, that functionality resides in a 3rd party application program that has been installed on the device. While there are various 3rd party geo-location, geo-fence and geo-route applications available to install on such mobile electronic devices, the functionality of these applications is severely limited because the operating system used by those devices does not support geo-aware functions necessary for those programs to operate at maximum efficiency.

While there are some simple geo-fencing capabilities built into IOS today, that functionality is limited to primitive functions such as opening a reminder when a geo-fence is crossed. For instance, the iOS on the Apple iPhone or the OS on an Android phone do not support the ability for a user to manipulate settings corresponding to a geo-route or to set a geo-fence around a Wi-Fi beacon. The same is true for available tablet and notebook computers. Thus, the operating system of these devices provide little to no support for geo-aware functionality. Instead, a user must first install an application, and then turn that application on every time they wish to perform a geo-aware function. Thus, the lack of geo-aware functions being integrated into the operating system causes user frustration at best or provides the user with suboptimal performance. Since 3rd party applications must be initiated by a user, and because 3rd party applications are easily and often disabled by these types of devices automatically, a user who wishes to frequently use geo-aware functions may be annoyed by having to initiate an application frequently.

There is, therefore, a need in the art for improved systems and methods of integrating geo-location, geo-fence, and geo-route functionality into the operating system of these devices more completely.

SUMMARY OF THE PRESENTLY CLAIMED INVENTION

Embodiments of the present invention relate to a method, system, and a non-transitory computer readable medium performing functions relating to geo-location, geo-fencing, or geo-routing. Preferred embodiments of the present invention are implemented, at least in part, in the operating system of a mobile electronic device. Advantages relating to implementing geo-fencing functions within the operating system of a mobile electronic device include allowing the mobile electronic device to always enable one or more geo-fencing functions when all applications are closed on the mobile electronic device.

Typically, settings relating to a geo-location, a geo-fence, or a geo-routing function may be set through a user interface on the mobile electronic device. Preferably, at least one of these settings are located in the operating system settings of the mobile electronic device.

A method for performing geo-fencing on a mobile device that is consistent with an embodiment of the invention includes receiving information from a user of the mobile device. This received information may be used to associate one or more functions with one or more identified geographic locations. Next, information relating to the identified geographic locations may be downloaded from a third party database into a memory in the mobile device. Once this information is downloaded, the current location of the mobile device may be monitored. The mobile device may also detect the presence of a beacon at the current location, which may result in updating of the stored information to include the geographic location of the detected beacon. The processor may also determines that the current location of the mobile device is part of a defined route. The information stored in memory may be updated by the processor to include geographic locations and geo-fences that are associated with the route. Each geo-fence may be defined as a specified range around one or more of the geographic locations. The processor may also compare the current location of the mobile device with the geo-fences and perform functions defined by a user of the mobile device when the mobile device crosses one of the defined geo-fences. Such a method may further include receiving one or more selections of operating system settings through a graphical user interface and may initiate a geo-fencing function using the operating system settings. An example of a function performed by the mobile device when a geo-fence is crossed is to transmit an alarm to another mobile device.

In certain instances, a geo-fencing function relates to a location and a perimeter around that location. Alerts, warnings, or messages may be sent from or emitted by a smartwatch when the smartwatch enters or leave the perimeter.

In other instances, a geo-fence function relates to a perimeter near a pre-defined route. Here again, alerts, warnings, or messages may be sent from or emitted by a smartwatch when the smart watch enters or leave the perimeter.

In yet other instances, a geo-route may be learned (or recorded) by the mobile electronic device as a user carries it while traversing a route or path.

DETAILED DESCRIPTION

Embodiments of the present invention relate to a method, system, and a non-transitory computer readable medium performing functions relating to geo-location, geo-fencing, or geo-routing. Preferred embodiments of the present invention may be implemented, at least in part, in the operating system of a mobile electronic device. Advantages relating to implementing geo-fencing functions within the operating system of a mobile electronic device may include allowing the mobile electronic device to always enable one or more geo-fencing functions when all applications are closed on the mobile electronic device. Typically, settings relating to a geo-location, a geo-fence, or a geo-routing function may be set through a user interface on the mobile electronic device. Preferably, at least one of these settings are located in the operating system settings of the mobile electronic device.

In certain instances, the present invention is implemented in a smartphone that includes a display for presenting a user interface to a user, an antenna that receives wireless signals, and a processor that executes instructions from a memory. Communications received by the smartphone through the antenna will cause the processor to execute instructions when implementing functions consistent with the invention. The smartphone will download information from a third party database regarding one or more geographic locations that are or will be associated with one or more fences. Such a fence around one or more geographic locations is herein referred to as a geo-fence. A geo-fence circumscribes one or more geographic locations or routes. A route includes a plurality of points, and a path is a route that is surrounded (circumscribed) by a geo-fence.

Figure 1:
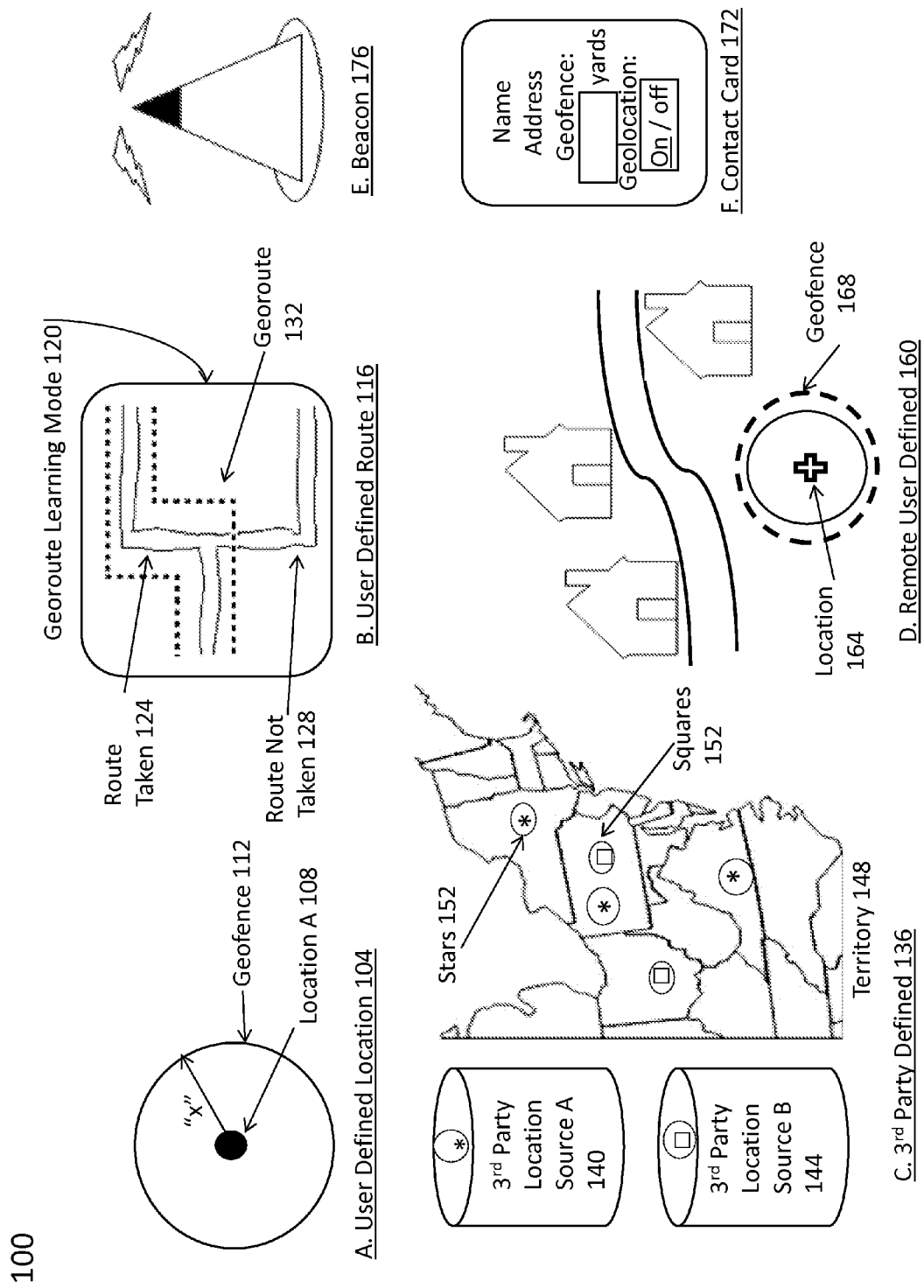
FIG. 1 illustrates an exemplary network environment in which a system for geo-fencing may be implemented.

FIG. 1 illustrates an exemplary network environment 100 in which a system for geo-fencing may be implemented. In certain instances, a geo-fence relates to a location and a perimeter around that location. FIG. 1 illustrates various ways for geo-fencing to be defined, including as a user-defined location 104, user-defined route 116, third party defined (location or route) 136, remote user-defined (location or route) 160, via a beacon 176, or via a contact card 172.

User-defined location 104 includes a location A 108 and a perimeter geo-fence 112 around location A 108. Typically, the perimeter "X" is a distance measured in units of distance, such as feet, miles, meters, or kilometers. In certain instances, a geo-fence may be established around a neighborhood. A user may be alerted to the fact that they have crossed the geo-fence and are entering the specified neighborhood.

Either the physical location of the mobile electronic device or a location that a user enters into the mobile electronic device may be used when setting a geo-location. In certain instances, a location may be a street address, a latitude/longitude, or the intersection of two roads. The physical location of the mobile electronic device may be determined by the device itself using global positioning (e.g., GPS) or a form of assisted global positioning (e.g., AGPS).

In other instances, the perimeter "X" may be a temporal perimeter, where "X" corresponds to a unit of time when a mobile electronic device is expected to arrive at location A 108. In this instance, the velocity of the mobile electronic device may be determined and used to estimate when the mobile electronic device may cross the perimeter.

User-defined route 116 may be define with respect to a particular route (which may be selected from a route taken 124 or a route not taken 128). The route taken 124 is illustrated as bracketed with dashed lines. (The route not taken 128 is illustrated without any bracketing.) In certain instances, geo-route learning mode 120 learns (or records) the route taken 124 as the mobile electronic device is moved from a start point to an end point of the route. This route may be transmitted to or be provided to others for use during a "walking tour" of a city. The route may include all turns and distances that the user device travels. In this instance, the mobile electronic device may record each distance and direction in which the user walks. Alternatively, the route recorded may include a series of points and a series of directions, where distances may be determined from using relative locations of at least two points.

Measures of direction may be absolute or relative. An example of a relative direction includes a direction from a particular starting location. An example of relative directions may be defined as follows: while standing in front of St. Timothy's, turn left and begin walking. An example of an absolute direction from a particular starting point may be: while standing in from of St. Timothy's turn North and begin walking.

In other instances, a route may be along roads or highways where every turn does not have to be accounted for. For example: from Capitol Expressway, drive on highway 680 South, and continue on highway 280 North until you reach San Francisco. Those familiar with these highways would know that the absolute direction of travel changes from south, to south by southwest, to north.

In certain instances, geo-route learning mode 120 in the user defined route 116 is a software algorithm that can learn a geo-route taken by the user. Typically, the route taken may be saved using absolute or relative directions. An example is software in a cellphone operating system that can be switched on at a start point, record one or more points and directions along the geo-route, and save the geo-route as the user travels to an end point. In certain instances, the cell phone could provide the user with a set of instructions in reverse. In such an instance, the cell phone would guide a user beginning at the end point, move through the one or more points in reverse order, while providing directions in reverse order through the cell phone's user interface.

As mentioned above, the route taken 124 includes two lines forming a path that is bracketed with dashed lines. The dashed lines indicate a geo-fence perimeter around the route or path. Thus, a user has the capability to define their own routes with a geo-fence perimeter around that route. An example of a use of a geo-fence perimeter around a route is a parent using a smartwatch to learn a walking path to their child's school. Once the path is learned and a perimeter defined around that path, a child following that path could be protected if the child strays off of the path. As soon as the child strays off of the path, the parent could be alerted with a text, a phone call, or an email indicating that their child strayed out of the defined geo-route. Such an alert could also indicate a point where the child strayed, and additional alerts can indicate the current location of the child.

3rd party-defined location 136 may be a pre-defined geo-location, geo-fence, or geo-route that corresponds to a company (e.g., Hertz). In certain instances, Hertz could be informed when a car crosses a geo-fence such that the car is expected to be returned to a facility shortly after it crosses the geo-fence.

3rd party location sources A 140 and B 144, may be database regarding various landmarks or locations. For example, third party location source B 144 may be a website providing downloadable information regarding historic monuments, each identified in an area providing geo-location data. Territory 148 as found in 3rd party defined 136 area is a geographic area that includes several states.

Geometric shapes, such as stars 152 or squares 156, may identify geo-locations and associated geo-fences that are located inside a geographic area (e.g., territory 148). In certain instances, geo-locations downloaded from a 3rd party location source A 140 correspond to a particular company location. In other instances, geo-locations downloaded from a 3rd party location source B 144 are downloaded from a 3rd party that lists historical monuments identified by a historical society. In either instance, an alert may be issued when the user's cell phone is 1 mile of an identified location.

Remote user-defined location 160 can be associated with an alert that can be sent to the user's cell phone via text message or email when the cell phone is within a distance of location 164. Location 164 is a geo-location defined by a remote user with a geo-fence 168 may be a street address or the location identified by a remote user.

Contact card 172 may be a digital file with personal contact information. Contact card 172 could include a switchable setting for enabling geo-location and geo-fence features. Contact information may be an electronic business card in vCard file format that includes the contact name, address, phone number. In certain instances, the vCard may include a geo-location and geo-fence feature that alerts the user when he is within a specified distance of the geo-fence.

Beacon 176 may also include a geo-fence and perimeter around the location of the beacon. An alert may be broadcast by a user's cell phone when it is determined that the user's cell phone is within a distance from the beacon or when the cell phone first receives the beacon 176. In certain instances, a Wi-Fi signal may be used as beacon 176.

In operation, a geo-location-enabled device may typically have a geo-location setting for a plurality of user defined geo-locations. User-defined location 104 is physical location A 108 with a geo-fence perimeter 112. User device may further reference user-defined routes (e.g., user-defined route 116). In certain instances, the user defined route 116 includes a software algorithm with a geo-route learning mode 120 capable of learning and remembering the route taken 124.

Figure 2:
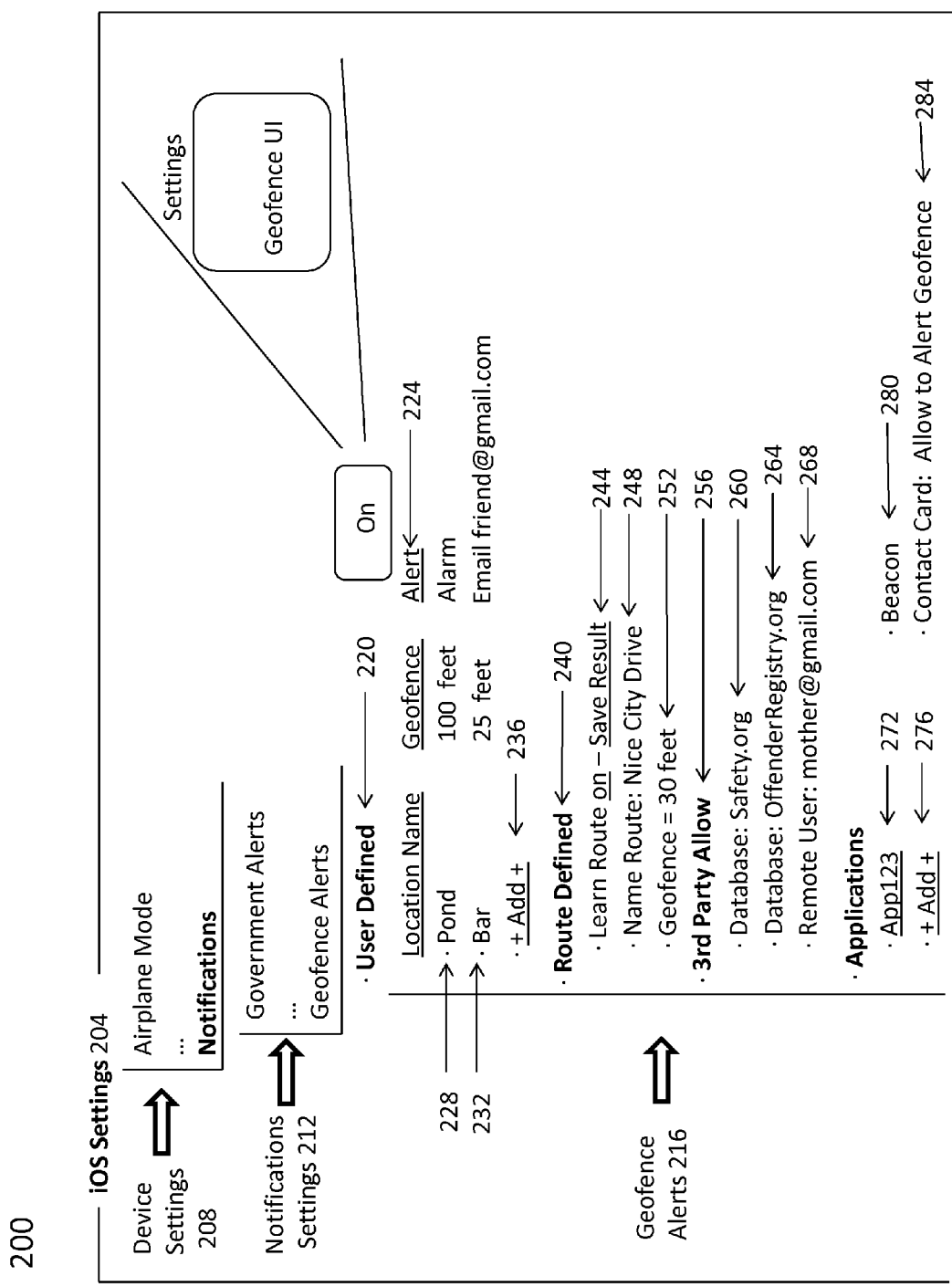
FIG. 2 is a diagram of exemplary operating system settings on a mobile device that may be used in a system for geo-fencing.

FIG. 2 is a diagram of exemplary operating system settings 200 on a mobile device that may be used in a system for geo-fencing. Operating system settings may be listed in a menu 204 of options. Such options may relate to notification settings 212, user-defined locations 220, route-defined locations 240, 3rd party allowed functions 256, and various applications (e.g., App123 272, app to be added 276, beacon 280, and contact card 284).

In certain instances, operating system settings 200 may be used for defining and adjusting operating parameters. Thus, a device running iOS may include both functional and visual settings that may be manipulated using sub-menus, buttons, or text panes.

Device settings 208 is a top menu with switchable buttons and text panes that allow a user to control major operating parameters of the device, such airplane mode and notification. Notifications settings 212 is a submenu that allow the user to set controls for the delivery of notifications and operating system messages. Examples of notifications include government alerts and geo-fence alerts.

Geo-fence alerts 216 is a sub-menu that allows the user to access controls for geo-fence alerts and notifications. In certain instances, this sub-menu allows the user access to controls for geo-fence notifications by feature.

User-defined 220 is a user interface function that allows a user to define geo-fence and geo-location settings. When enabled, the user may manipulate geo-location names, geo-fence perimeters, and alerts. Alert 224 is an option allow for certain alerts to fire when a user device is detected as being within a certain distance of a specified location. Alert 224 may be a menu with a switchable setting that allows the user to enter a geo-location ("house"), a geo-fence perimeter (75 feet), and an alert type. An alert type may be an email to a remote user or an alarm. A first illustrated alert 228 may be set to fire when a mobile electronic device is within 100 feet of pond. The second illustrated alert 232 may be trigger an email to a friend (e.g., friend@gmail.com) when the mobile electronic device is within 25 feet of a particular bar. Add 236 is a function that allows a user to add geo-locations, geo-fences, and alerts.

Route-defined 240 allows the user to create geo-routes with route-learning software algorithms. It may allow for a menu screen with switchable settings that allows a software algorithm to learn a route that a user drives. Route-defined 240 options may include learn route 244, name route 248, and geo-fence 252. As illustrated, learn route 244 is turned "on" with the setting "save result". The name of the route 248 depicted is "nice city to drive", and the geo-fence perimeter setting is 30 feet. Once the route is learned, a mobile electronic device may be used to keep a user within 30 feet of the route when the user is traversing that route.

3rd party allow 256 options allow for use of third party databases regarding geo-location information. Such databases may include databases such as safety.org 260 or offenderrigistry.org 264. Additional third parties may be identified as a remote user: mother@gmail.org 268. When database safety.org 260 is selected by a user, a plurality of geo-routes and geo-fences relating to safety may be downloaded onto the user's mobile electronic device. The database may typically allow the user to view safe places or safety hazards near a current location or near a selected or defined location.

Offenderregistry.org database 264 enables the user to download geo-fences and geo-locations identifying locations where individuals with a criminal history are known to currently reside. Remote user 268 options allow a user to configure alerts to be sent to mother@gmail.com when a mobile electronic device worn by a child crosses a geo-fence.

Applications such as App123 272, beacon 280, and contact card enable a user to install and configure geo-functions relating to specific program applications on the user's mobile electronic device. Add 276 is a function that allows a user to add specific applications or to initiate certain applications (e.g., Facebook) with a real-time geo-fence alert.

Beacon 280 is a user interface function for enabling alerts and system messages relating to certain types of beacons. When the user is within a set distance from a particular beacon 280, an alert may be sent from or a recommendation may be sent to the user's mobile electronic device. For example, the user might receive the message the message "Go to Joes.com for Coupons!" when the user is near Joes grocery.

Contact card 284 is a user interface function with switchable settings for enabling digital contact cards. In certain instances, contact card 284 triggers geo-fence alerts or receives geo-fence messages when they are near a friend's office. For example, the user may receive the alert "you are near Jim's office, currently sending Jim a reminder of your lunch appointment at the cafe". At that moment, the user's cell phone could automatically send Jim a text message reminding him of the lunch appointment.

Figure 3:
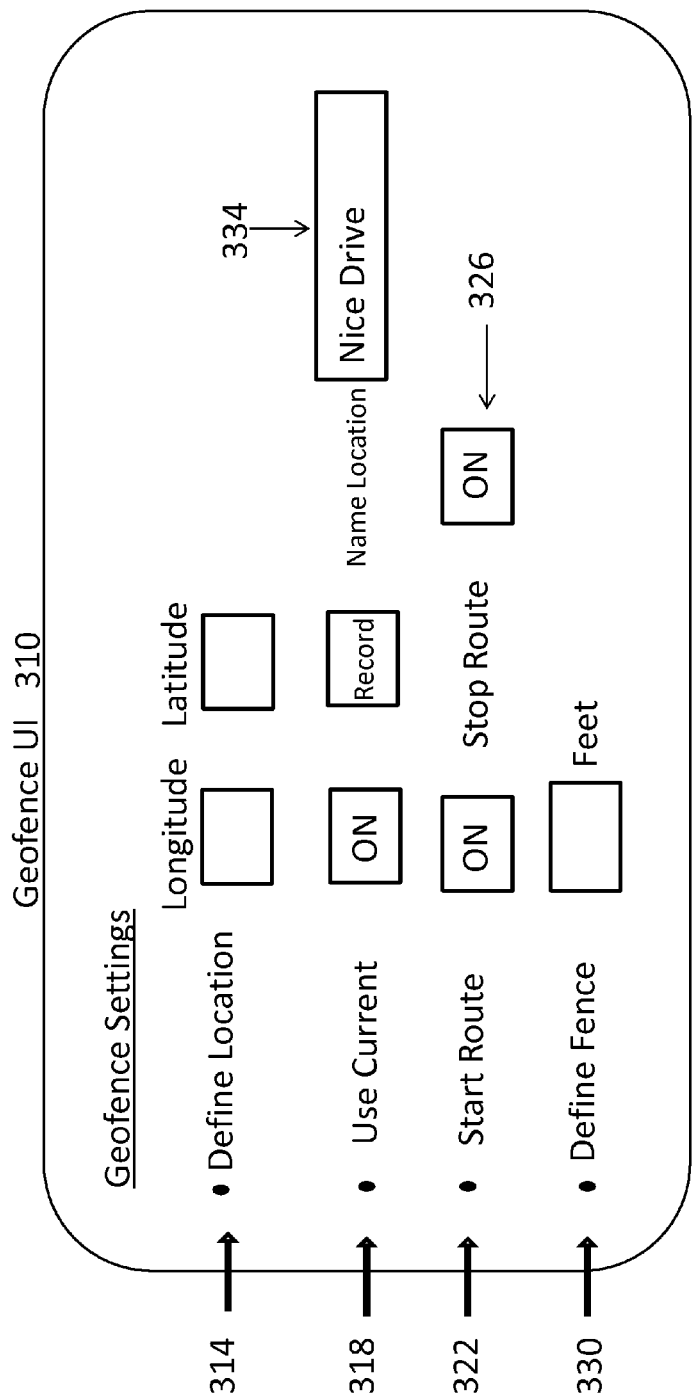
FIG. 3 illustrates an exemplary user interface of a mobile device that may be used in a system for geo-fencing.

FIG. 3 illustrates an exemplary user interface 300 of a mobile device that may be used in a system for geo-fencing. The user interface 300 may specifically include a geo-fence UI 310, which provides options to define location 314, use current location 318, name location 334 (e.g., "Nice Drive"), start route 322, stop route 326, and define fence 310. In certain instances, these settings may be used independently. In other instances, they may be used in combination. For example, define location 314 is identified by entering in a longitude and a latitude, and a value of 30 feet may be entered to define fence 330 when configuring the location and perimeter of a geo-fence. In certain instances, define fence 330 is a text pane allowing numeric entry for the length in feet or miles of the perimeter distance for a geo-location or geo-route. Another example is when a user selects "Nice Drive" 334. The user may be presented with the route that corresponds to "Nice Drive" 334. In certain instances, the name of route "Nice Drive" 334 may be changed by a user in a text pane.

In instances where a user wishes to record a route, they may initiate learning of the route by turning start route 322 on before they begin walking from the start location. After the user has walked to a stop location, the user may then turn stop route 326 on. During the walk, the user's smartphone may record each change in direction and a corresponding point where the user changed direction. When the user turns stop route 326 on, the user's smartphone may have recorded the entire route. Embodiments of the invention may include visual elements, consisting of graphics, menus, buttons, and text panes. Preferred embodiments of the invention include, yet are not limited to, implementing the invention in the IOS of an Apple iPhone or iPad. Furthermore, use current 318 enables the device to record the current location of the user. Use current 318 may be used to establish a geo-location point or when initiation the recording of a geo-route.

In operation, a geo-location-enabled iPhone may manipulate the aforementioned settings to set a geo-fence location, to define locations, to define routes, use a current location, or to enable an intelligent route learning mode.

Figure 4:
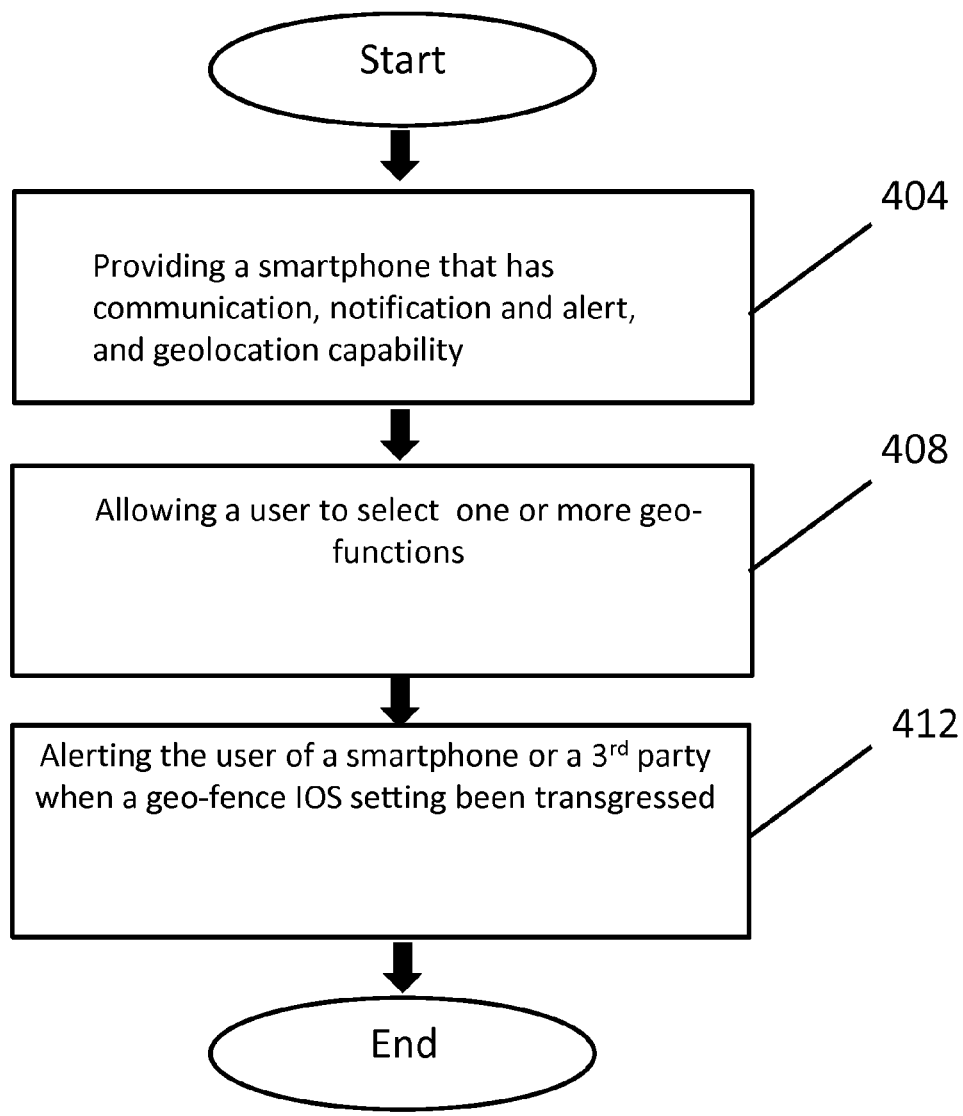
FIG. 4 is a flowchart illustrating an exemplary method for geo-fencing.

FIG. 4 is a flowchart illustrating an exemplary method 400 for geo-fencing. Method 400 allows for a virtual perimeter (geo-fence) around a geographic location to be established, for an alert relating to a geo-fence to be defined, and/or for the learning of a geo-route to occur.

Step 404 involves providing a smartphone that has communication, notification/alert, and geo-location capability. Such a smartphone may natively support digital communications and geo-aware functions. In certain instances, step 404 allows the user to transmit or receive alerts by means of a digital transmission. Alerts may also be issued to the user by the smartphone presenting an audio message, video message, or text message to the user.

Step 408 involves allowing a user to select one or more geo-functions. Geo-functions setup during this step typically include at least one of a user-defined location, a user-defined route, defining via a 3rd party database, and/or identifying a beacon. In certain instances, a remote user may be enabled to change settings on the mobile electronic device when that device is in the possession of another individual. In yet other instances, a geo-fence distance may be set, geo-locations or geo-routes may be selected, or notifications and alerts may be configured. Thus, step 408 allows a user to configure any one of a variety of geo-aware functions.

Step 412 involves alerting the user of a smartphone or a 3rd party when a geo-fence IOS setting has been transgressed. In step 412, one or more types of alerts may be provided when a geo-fence has been crossed. In certain instances, the user interface of the smartphone presents an alert, provides a system message, transmits a text, or sends visual or sound elements to a 3rd party when the smartphone crosses a geo-fence.

Figure 5:
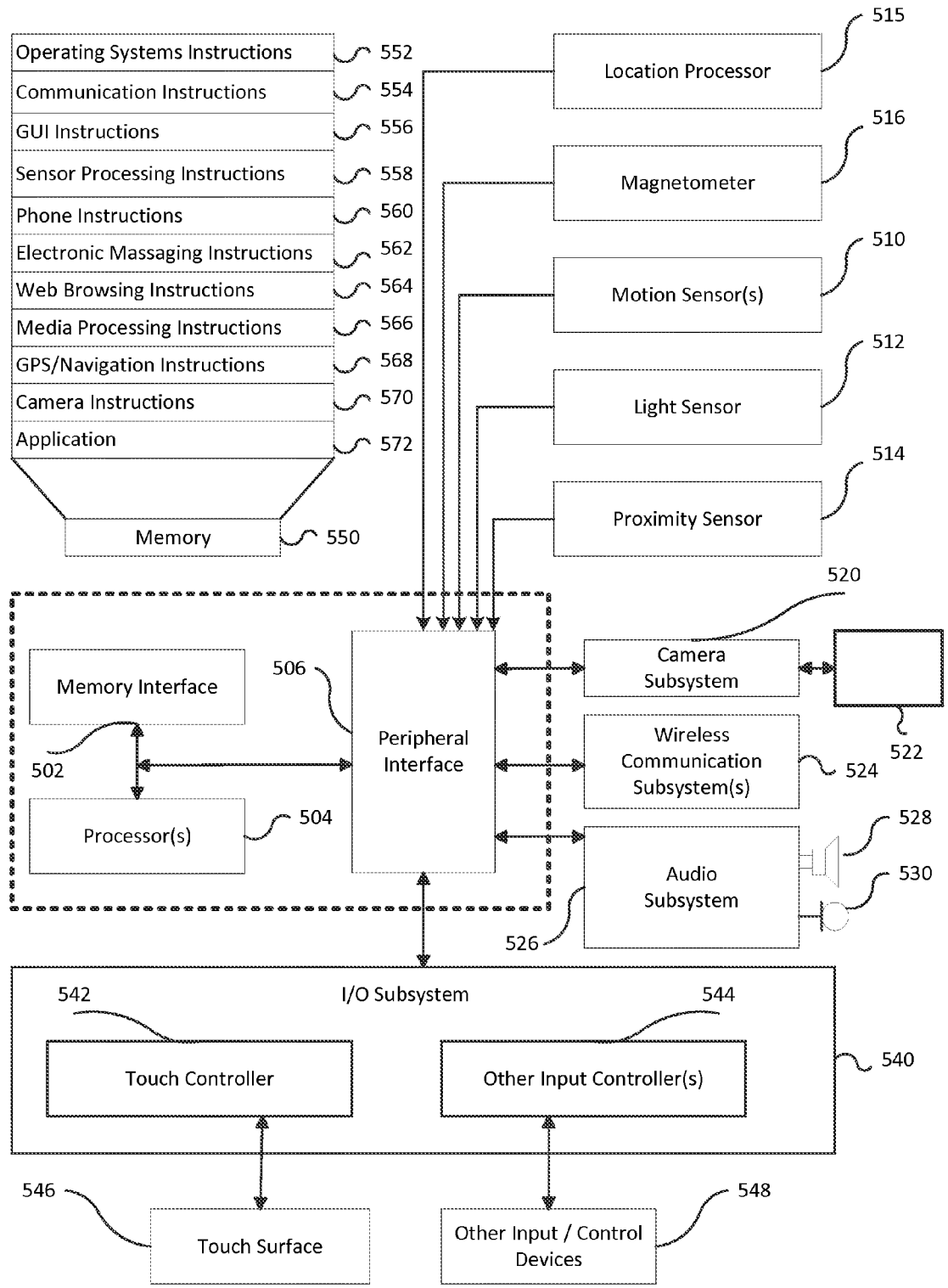
FIG. 5 illustrates an exemplary architecture of a user device that may be used in a system for geo-fencing.

FIG. 5 illustrates an exemplary architecture of a user device that may be used in a system for geo-fencing. Architecture 500 can be implemented in any number of portable user devices. Architecture 500 includes memory interface 502, processors 504, and peripheral interface 506. Memory interface 502, processors 504, and peripherals interface 506 can be separate components or can be integrated as a part of one or more integrated circuits. The various components can be coupled by one or more communication buses or signal lines.

Processors 504 may include one or more data processors, image processors, central processing unit, or any variety of multi-core processing devices. Any variety of sensors, external devices, and external subsystems can be coupled to peripherals interface 506 to facilitate any number of functionalities within the architecture 500 of the exemplary mobile device. For example, motion sensor 510, light sensor 512, and proximity sensor 514 can be coupled to peripherals interface 506 to facilitate orientation, lighting, and proximity functions of the mobile device. For example, light sensor 512 could be utilized to facilitate adjusting the brightness of touch surface 546. Motion sensor 510, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 506, such as a temperature sensor, a biometric sensor, or other sensing device to facilitate corresponding functionalities. Location processor 515 (e.g., a global positioning transceiver) can be coupled to peripherals interface 506 to allow for generation of geo-location data thereby facilitating geo-positioning. An electronic magnetometer 516, such as an integrated circuit chip, could in turn be connected to peripherals interface 506 to provide data related to the direction of true magnetic north, whereby the mobile device could enjoy compass or directional functionality. Camera subsystem 520 and an optical sensor 522 such as a charged coupled device (CCD) or a complementary metal-oxide semiconductor (CMOS) optical sensor can facilitate camera functions such as recording photographs and video clips.

Communication functionality can be facilitated through one or more communication subsystems 524, which may include one or more wireless communication subsystems. Wireless communication subsystems 524 can include 802.5 or Bluetooth transceivers, as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 524 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.5 communication networks, code division multiple access (CDMA) networks, or Bluetooth networks. Communication subsystem 524 may include hosting protocols such that the device may be configured as a base station for other wireless devices. Communication subsystems can also allow the device to synchronize with a host device using one or more protocols such as TCP/IP, HTTP, or UDP.

Audio subsystem 526 can be coupled to a speaker 528 and one or more microphones 530 to facilitate voice-enabled functions. These functions might include voice recognition, voice replication, or digital recording. Audio subsystem 526 in conjunction may also encompass traditional telephony functions.

I/O subsystem 540 may include touch controller 542 and/or other input controller(s) 544. Touch controller 542 can be coupled to a touch surface 546. Touch surface 546 and touch controller 542 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 546 may likewise be utilized. In one implementation, touch surface 546 can display virtual or soft buttons and a virtual keyboard, which can be used as an input/output device by the user.

Other input controllers 544 can be coupled to other input/control devices 548 such as one or more buttons, rocker switches, thumb-wheels, infrared ports, USB ports, and/or a pointer device such as a stylus. The one or more buttons (not shown) can include an up/down button for volume control of speaker 528 and/or microphone 530. In some implementations, device 500 can include the functionality of an audio and/or video playback or recording device and may include a pin connector for tethering to other devices.

Memory interface 502 can be coupled to memory 550. Memory 550 can include high-speed random access memory or non-volatile memory such as magnetic disk storage devices, optical storage devices, or flash memory. Memory 550 can store operating system 552, such as Darwin, RTXC, LINUX, UNIX, OS X, ANDROID, WINDOWS, or an embedded operating system such as VXWorks. Operating system 552 may include instructions for handling basic system services and for performing hardware dependent tasks. In some implementations, operating system 552 can include a kernel.

Memory 550 may also store communication instructions 554 to facilitate communicating with other mobile computing devices or servers. Communication instructions 554 can also be used to select an operational mode or communication medium for use by the device based on a geographic location, which could be obtained by the GPS/Navigation instructions 568. Memory 550 may include graphical user interface instructions 556 to facilitate graphic user interface processing such as the generation of an interface; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/navigation instructions 568 to facilitate GPS and navigation-related processes, camera instructions 570 to facilitate camera-related processes and functions; and instructions 572 for any other application that may be operating on or in conjunction with the mobile computing device. Memory 550 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 550 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer may employ to access functions supporting the API. In some implementations, an API call can report to an application the capabilities of a device running the application, such as input capability, output capability, processing capability, power capability, and communications capability.

Users may use any number of different electronic user devices, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network. User devices may also be configured to access data from other storage media, such as memory cards or disk drives as may be appropriate in the case of downloaded services. User device may include standard hardware computing components such as network and media interfaces, non-transitory computer-readable storage (memory), and processors for executing instructions that may be stored in memory.

The figures included with this disclosure are for the purpose of illustrating the invention. The figures show aspects of one or more embodiments of the invention and are examples, the figures are not meant to limit the scope of the invention. So it should be understood that the present invention is not limited to the precise arrangements and instrumentalities shown in the figures.

What is claimed is:

1. A method for performing geo-fencing on a mobile device, the method comprising:
receiving information from a user of the mobile device, the received information associating one or more functions with one or more identified geographic locations;
downloading information from one or more third party databases regarding a plurality of geographic locations, wherein the downloaded information is stored in memory of the mobile device; and
executing instructions stored in memory, wherein execution of the instructions by a processor:
monitors a current location of the mobile device, wherein a presence of a beacon is detected by the mobile device at the current location, updates the stored information to include a geographic location of the detected beacon, determines that the current location of the mobile device is part of a defined route, wherein the stored information is updated to include one or more geographic locations associated with the route, defines one or more geo-fences, each geo-fence defined as a specified range around an associated one of the geographic locations included in the updated information, compares the current location of the mobile device with the defined geo-fences, wherein the comparison indicates that the mobile device has crossed one of the defined geo-fences, and wherein the crossed geo-fence is associated with one of the geographic locations identified by the user, and performs at least one of the functions associated with the identified geographic location in accordance with the received information from the user.

2. The method of claim 1, wherein the received information includes a start point and a stop point to the route, and wherein the route is circumscribed by one of the one or more geo-fences that identifies a path, wherein the path is within a perimeter distance around a line connecting one or more points along the route.

3. The method of claim 1, wherein the route was learned by a method comprising:

identifying a start location when the user indicates the start of the route;

tracking one or more points along the route, wherein each point is associated with a direction of travel and a distance of travel from another point of one or more points along the route, wherein the geo-fence identifies the path as being within a perimeter distance around a line connecting the one or more points along the route; and identifying an end location when the user indicates the end of the route.

4. The method of claim 2, further comprising providing reverse directions based on the learned route, wherein the reverse directions follow the learned route in reverse.

5. The method of claim 1, wherein the specified range is a physical distance defined by the user.

6. The method of claim 1, wherein the one or more functions include an alert that is initiated when the current location of the mobile device is within the specified range of the one or more identified geographic locations.

7. The method of claim 1, wherein the specified range is a temporal distance defined by the user, wherein the one or more functions are performed when the mobile device is estimated to be within the temporal distance of the identified one or more geographic locations.

8. The method of claim 1, wherein the perimeter distance around the beacon is determined by receiving a signal from the beacon.

9. The method of claim 3, further comprising providing reverse directions based on the learned route, wherein the reverse directions follows the learned route in reverse.

10. The method of claim 1, wherein the received information comprises an identification of a remote user device.

11. The method of claim 1, wherein the received information comprises a contact card identified by the user.

12. An apparatus for performing geo-fencing on a mobile device, the apparatus comprising:

a user interface that receives information from a user, the received information associating one or more functions with one or more identified geographic locations;

an antenna that receives wireless signals, wherein the antenna is used when downloading information from one or more third party databases regarding a plurality of geographic locations; and a processor that executes instructions stored in memory, wherein the information downloaded is also stored in the memory, wherein execution of the instructions by the processor:

monitors a current location of the mobile device, wherein a presence of a beacon is detected by the mobile device at the current location, updates the stored information to include a geographic location of the detected beacon, determines that the current location of the mobile device is part of a defined route, wherein the stored information is updated to include one or more geographic locations associated with the route, defines one or more geo-fences, each geo-fence defined as a specified range around an associated one of the geographic locations included in the updated information, compares the current location of the mobile device with the defined geo-fences, wherein the comparison indicates that the mobile device has crossed one of the defined geo-fences, and wherein the crossed geo-fence is associated with one of the geographic locations identified by the user, and performs at least one of the functions associated with the identified geographic location in accordance with the received information from the user.

13. The apparatus of claim 12, wherein the received information includes a start point and a stop point of the route, and wherein the route is circumscribed by one of the one or more geo-fences that identifies a path, wherein the path is within a perimeter distance around a line connecting one or more points along the route.

14. The apparatus of claim 13, wherein the processor learns the route by:

identifying a start location when the user indicates the start of the route;

tracking one or more points along the route, wherein each point is associated with a direction of travel and a distance of travel from another point of one or more points along the route, wherein the geo-fence identifies the path as being within a perimeter distance around a line connecting the one or more points along the route; and identifying an end location when the user indicates the end of the route.

15. The apparatus of claim 12, wherein the specified range is a physical distance defined by the user.

16. The apparatus of claim 12, wherein the specified range is a temporal distance defined by the user, wherein the one or more functions are performed when the mobile device is estimated to be within the temporal distance of the identified on or more geographic locations.

17. A non-transitory computer readable medium having embodied thereon a program executable by a process to perform a method for performing geo-fencing in a mobile device, the method comprising:

receiving information from a user of the mobile device, the received information associating one or more functions with one or more identified geographic locations;

downloading information from one or more third party databases regarding a plurality of geographic locations, wherein the downloaded information is stored in memory of the mobile device; and executing instructions stored in memory, wherein execution of the instructions by a processor:
monitors a current location of the mobile device, wherein a presence of a beacon is detected by the mobile device at the current location,
updates the stored information to include a geographic location of the detected beacon,
determines that the current location of the mobile device is part of a defined route, wherein the stored information is updated to include one or more geographic locations associated with the route,
defines one or more geo-fences, each geo-fence defined as a specified range around an associated one of the geographic locations included in the updated information,
compares the current location of the mobile device with the defined geo-fences, wherein the comparison indicates that the mobile device has crossed one of the defined geo-fences, and wherein the crossed geo-fence is associated with one of the geographic locations identified by the user, and
performs at least one of the functions associated with the identified geographic location in accordance with the received information from the user.

18. The non-transitory computer readable medium of claim 17, wherein the program being further executable to learn the route by:
identifying a start location when the user indicates the start of the route;
tracking one or more points along the route, wherein each point is associated with a direction of travel and a distance of travel from another point of one or more points along the route, wherein the geo-fence identifies the path as being within a perimeter distance around a line connecting the one or more points along the route; and
identifying an end location when the user indicates the end of the route.

19. The non-transitory computer readable medium of claim 18, the program being further executable to provide reverse directions based on the learned route, wherein the reverse directions follow the learned route in reverse.

20. The non-transitory computer readable medium of claim 17, wherein the specified range is a physical distance defined by the user.

* * * * *